US012619783B2

(12) United States Patent
Shim et al.

(10) Patent No.: US 12,619,783 B2
(45) Date of Patent: May 5, 2026

(54) AUTOMATIC PSEUDONYMIZATION TECHNIQUE RECOMMENDATION METHOD USING ARTIFICIAL INTELLIGENCE

(71) Applicant: EASYCERTI INC., Seoul (KR)

(72) Inventors: Gi Chang Shim, Seoul (KR); Yong Kyu Park, Seoul (KR)

(73) Assignee: EASYCERTI INC., Seoul (KR)

( * ) Notice: Subject to any disclaimer, the term of this patent is extended or adjusted under 35 U.S.C. 154(b) by 14 days.

(21) Appl. No.: 18/812,227

(22) Filed: Aug. 22, 2024

(65) Prior Publication Data

US 2025/0068769 A1     Feb. 27, 2025

(30) Foreign Application Priority Data

Aug. 25, 2023     (KR) ......................... 10-2023-0111703

(51) Int. Cl.
G06F 21/62          (2013.01)

(52) U.S. Cl.
CPC ................................ G06F 21/6254 (2013.01)

(58) Field of Classification Search
CPC ................................................... G06F 21/6254
See application file for complete search history.

(56) References Cited

U.S. PATENT DOCUMENTS

| | | | | |
|---|---|---|---|---|
| 11,526,508 | B1 * | 12/2022 | McCallie, Jr. | .... G06F 16/24522 |
| 11,599,749 | B1 * | 3/2023 | Ziaeefard | ................. G06N 3/08 |
| 2016/0254911 | A1 | 9/2016 | Manchepalli et al. | |

| | | | | |
|---|---|---|---|---|
| 2019/0354720 | A1 * | 11/2019 | Tucker | ................ G06F 21/6254 |
| 2021/0133557 | A1 * | 5/2021 | Iyoob | ................. G06V 10/7784 |
| 2022/0188699 | A1 * | 6/2022 | Matlick | ............... G06F 21/6254 |
| 2022/0382906 | A1 | 12/2022 | Wu et al. | |
| 2023/0195933 | A1 * | 6/2023 | Satish Padmanabhan | .................. G06F 40/263 726/26 |
| 2024/0062011 | A1 * | 2/2024 | Kanuga | ................. G06F 40/295 |
| 2024/0062044 | A1 * | 2/2024 | Subramanian | .......... G06F 40/30 |
| 2024/0095394 | A1 * | 3/2024 | Madhavan | .......... G06F 21/6245 |
| 2024/0119175 | A1 * | 4/2024 | Middleton | .......... G06F 21/6254 |

FOREIGN PATENT DOCUMENTS

| | | |
|---|---|---|
| JP | 2021-503648 A | 2/2021 |
| JP | 2023-070942 A | 5/2023 |

* cited by examiner

*Primary Examiner* — Techane Gergiso
(74) *Attorney, Agent, or Firm* — Rabin & Berdo, P.C.

(57) ABSTRACT

Provided is an automatic pseudonymization technique recommendation method using artificial intelligence, including receiving a training dataset including a plurality of pieces of data including a column name, a data type, a pseudonymization technique recommendation, adding, a data type vector obtained from the data type to a word vector obtained corresponding to the column name to obtain a numeric vector, and labeling the numeric vector with the pseudonymization technique recommendation to generate a plurality of pieces of training data, training a first learning model using the plurality of pieces of training data so that the first learning model outputs a pseudonymization technique recommendation in response to an input of the numeric vector, obtaining a numeric vector corresponding to each column of the dataset to be pseudonymized, and inputting the numeric vector obtained into the trained first learning model to obtain a pseudonymization technique recommendation for each column of the dataset.

6 Claims, 5 Drawing Sheets

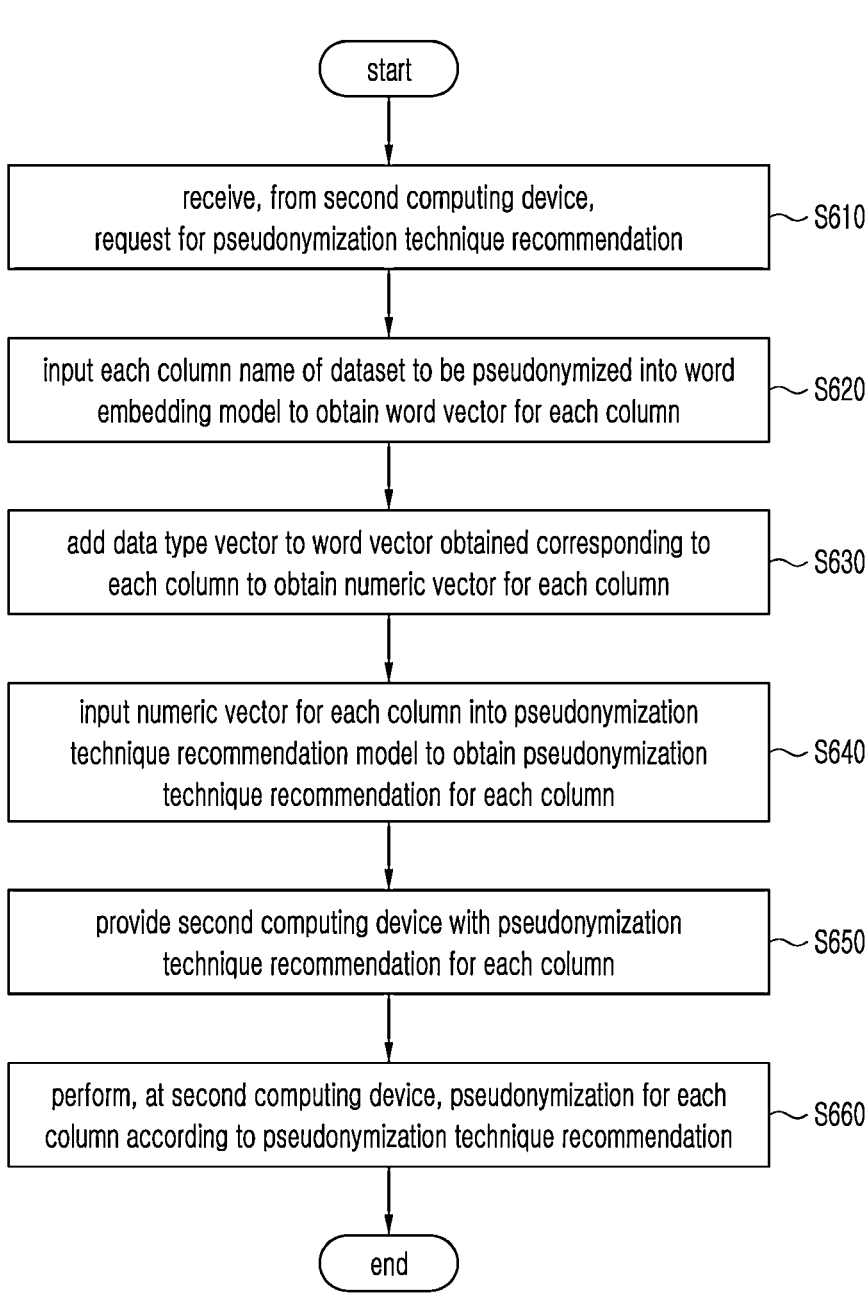

start receive, from second computing device,
request for pseudonymization technique recommendation — S610 input each column name of dataset to be pseudonymized into word
embedding model to obtain word vector for each column — S620 add data type vector to word vector obtained corresponding to
each column to obtain numeric vector for each column — S630 input numeric vector for each column into pseudonymization
technique recommendation model to obtain pseudonymization
technique recommendation for each column — S640 provide second computing device with pseudonymization
technique recommendation for each column — S650 perform, at second computing device, pseudonymization for each
column according to pseudonymization technique recommendation — S660 end

AUTOMATIC PSEUDONYMIZATION TECHNIQUE RECOMMENDATION METHOD USING ARTIFICIAL INTELLIGENCE

CROSS-REFERENCE TO RELATED APPLICATION

This application claims priority to Korean Patent Applications No. 10-2023-0111703, filed in the Korean Intellectual Property Office on Aug. 25, 2023, the entire contents of which are hereby incorporated by reference.

BACKGROUND

Field

The present disclosure relates to a pseudonymization technique recommendation method, and more particularly to a pseudonymization technique recommendation method using artificial intelligence.

Description of Related Art

In the related art, common sense, learning, or preferences of an individual user determined the selection of pseudonymization technique for use. Different pseudonymization techniques are selected and used based on user's experiences and preferences, such as, for example, for a column "name", some users chose masking, some chose bidirectional encryption, some chose a heuristic pseudonymization technique, and so on.

The problem with the related method of selecting pseudonymization techniques is that the selection is heavily biased toward the experience and taste of individual users such that every change in personnel in charge led to a burdensome process of job handover and consumption of human resources and time. In addition, it is cumbersome to look up all the processing history to refer to the past techniques used for a particular column.

SUMMARY

In order to solve one or more problems (e.g., the problems described above and/or other problems not explicitly described herein), the present disclosure provides an automatic pseudonymization technique recommendation method using artificial intelligence.

According to some aspects of the disclosure, an automatic pseudonymization technique recommendation method using artificial intelligence implemented on a computing device may include receiving a training dataset including a plurality of pieces of data including a column name, a data type, and a pseudonymization technique recommendation, adding, for each of the plurality of pieces of data, a data type vector obtained from the data type to a word vector obtained corresponding to the column name to obtain a numeric vector, and labeling the numeric vector with the pseudonymization technique recommendation to generate a plurality of pieces of training data, training a first learning model using the plurality of pieces of training data so that the first learning model outputs a pseudonymization technique recommendation in response to an input of the numeric vector, obtaining a numeric vector corresponding to each column of the dataset to be pseudonymized, and inputting the numeric vector obtained corresponding to each column of the dataset to be pseudonymized into the trained first learning model to obtain a pseudonymization technique recommendation for each column of the dataset to be pseudonymized.

The obtaining the numeric vector corresponding to each column of the dataset to be pseudonymized may include inputting a column name corresponding to each column of the dataset to be pseudonymized into a second learning model to obtain a word vector of each column of the dataset to be pseudonymized, obtaining a data type vector corresponding to the data type of each column of the dataset to be pseudonymized, and adding the data type vector to the word vector obtained for each column of the dataset to be pseudonymized to obtain a numeric vector corresponding to each column of the dataset to be pseudonymized.

The plurality of pieces of data included in the training dataset may further include industry classification information.

The numeric vector obtained when generating the training data may further include an industry classification vector obtained from industry classification information.

The obtaining the numeric vector corresponding to each column of the dataset to be pseudonymized may include inputting a column name corresponding to each column of the dataset to be pseudonymized into a second learning model to obtain a word vector of each column of the dataset to be pseudonymized, obtaining a data type vector corresponding to the data type of each column of the dataset to be pseudonymized, obtaining an industry classification vector corresponding to industry classification information previously set for the dataset to be pseudonymized, and adding the data type vector and the industry classification vector to the word vector obtained for each column of the dataset to be pseudonymized to obtain a numeric vector corresponding to each column of the dataset to be pseudonymized.

The method may further include training or retraining the second learning model using a plurality of column names obtained from the training dataset.

The first learning model may be a decision tree model.

The second learning model may be a word embedding model.

The word embedding model may be a FastText model.

The decision tree model may be a Gradient Boosting Trees model.

The method may further include performing pseudonymization on the dataset to be pseudonymized based on the pseudonymization technique recommendation obtained for each column of the dataset to be pseudonymized.

An embodiment of the present disclosure for solving the technical problem described above includes a non-transitory computer-readable recording medium recording a program for the automatic pseudonymization technique recommendation using artificial intelligence described above.

A computing device for solving the technical problems described above according to an embodiment of the present disclosure may include a processor, and a memory that stores an instruction or program executable by the processor, in which, when the instruction or program is executed by the processor, the automatic pseudonymization technique recommendation method using artificial intelligence may be executed.

According to some aspects of the disclosure, there is an advantage in that pseudonymization techniques can be automatically recommended to users unfamiliar with pseudonymization work, based on the history of pseudonymization technique application.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawing, in which:

FIG. 6 is a flowchart showing a pseudonymization technique recommendation process using artificial intelligence.

DETAILED DESCRIPTION

Figure 1:
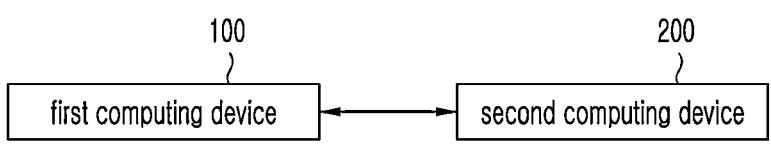
FIG. 1 is a block diagram schematically showing an automatic pseudonymization technique recommendation system using artificial intelligence.

Hereinafter, certain embodiments will be described in detail with reference to the accompanying drawings to help those with ordinary knowledge in the art easily achieve the present disclosure.

The terms are used herein for the purpose of describing the embodiments and not intended to limit the present disclosure. In the description, a singular expression also includes a plural expression unless specifically stated otherwise in the context. The terms "comprises" and/or "comprising" as used herein do not foreclose the presence or addition of one or more components other than the specified component. Throughout the description, the same reference numerals refer to the same components, and "and/or" includes each and combinations of one or more of the specified components. The terms "first", "second", etc. are used to describe various components, but it goes without saying that these components are not limited by these terms. These terms are only used to distinguish one component from another. Therefore, it goes without saying that a first component mentioned below may be a second component within the technical idea of the present disclosure.

A "computing device" as used herein includes all various devices capable of performing computations and providing results to a user. For example, a computing devices may include desktop PCs, notebook computers, and server computers, as well as smart phones, tablet PCs, cellular phones, PCS phones (Personal Communication Service phones), synchronous and asynchronous IMT-2000 (International Mobile Telecommunication-2000) mobile terminals, palm personal computers (Palm PCs), and personal digital assistants (PDAs).

FIG. 1 is a block diagram schematically showing an automatic pseudonymization technique recommendation system using artificial intelligence.

Referring to FIG. 1, the pseudonymization technique recommendation system using artificial intelligence may include a first computing device 100 and a second computing device 200.

The first computing device 100 and the second computing device 200 may exchange various information and data over a communication network.

The communication network may include a local area network (LAN), a metropolitan area network (MAN), a wide area network (WAN), the Internet, 2G, 3G, 4G, LTE mobile communication network, Bluetooth, a Wi-Fi, Wibro, a satellite communication network, a low power wide area (LPWA) network such as LoRa, Sigfox, etc., and any communication method regardless of whether the communication method is wired or wireless.

In response to a request for pseudonymization technique recommendation for a dataset to be pseudonymized from the second computing device 200, the first computing device 100 may generate information on pseudonymization technique recommendation (hereinafter, "pseudonymization technique recommendation information") for each column of the dataset.

The second computing device 200 may receive, from the first computing device 100, the pseudonymization technique recommendation information for the dataset and execute the pseudonymization operation for the dataset accordingly.

Figure 2:
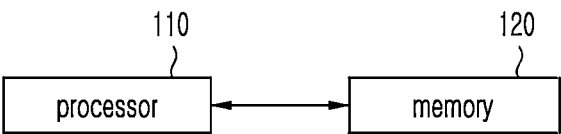
FIG. 2 is a block diagram schematically showing a configuration of a first computing device.

FIG. 2 is a block diagram schematically showing a configuration of a first computing device.

Referring to FIG. 2, the first computing device 100 may include at least one processor 110 and at least one memory 120. In addition, the first computing device 100 may further include a communication device, a user input/out device, etc.

The processor 110 may execute instructions and/or computer programs stored in the memory 120 to execute, at the first computing device 100, the pseudonymization technique recommendation method using artificial intelligence.

The memory 120 may be a recording medium readable by the processor 110 and may store an operating system and one or more instructions and/or programs In addition, the memory 120 may store various information and data related to executing, at the first computing device 100, an automatic pseudonymization technique recommendation method using artificial intelligence.

Figure 3:
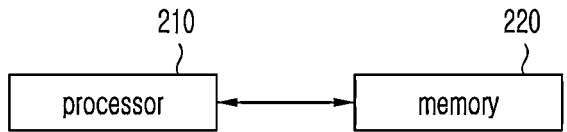
FIG. 3 is a block diagram schematically showing a configuration of a second computing device.

FIG. 3 is a block diagram schematically showing a configuration of a second computing device.

Referring to FIG. 3, the second computing device 200 may include at least one processor 210 and at least one memory 220. In addition, the second computing device 200 may further include a communication device, a user input/out device, etc.

The processor 210 may execute instructions and/or computer programs stored in the memory 220 to perform pseudonymization for the dataset to be pseudonymized, based on the pseudonymization technique recommendation information provided by the first computing device 100, in response to the request by the second computing device 200 to the first computing device 100 for the pseudonymization technique recommendation for the dataset to be pseudonymized.

The memory 220 may be a recording medium readable by the processor 210 and may store an operating system and one or more instructions and/or programs In addition, the memory 220 may store various information and data related to executing, at the second computing device 200, pseudonymization for the dataset to be pseudonymized.

Figure 4:
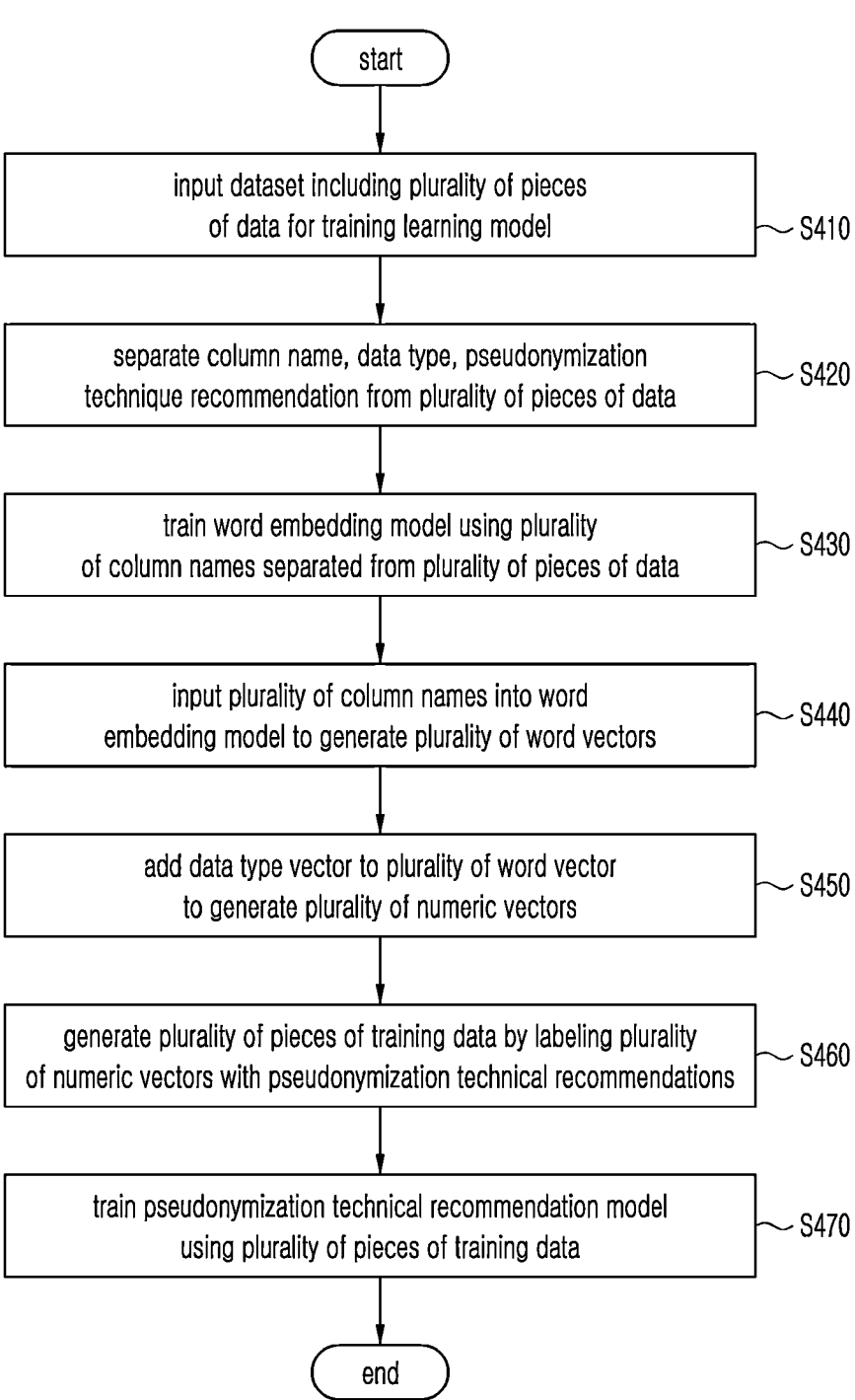
FIG. 4 is a flowchart provided to explain a learning process of an artificial intelligence-based learning model.
Figure 5:
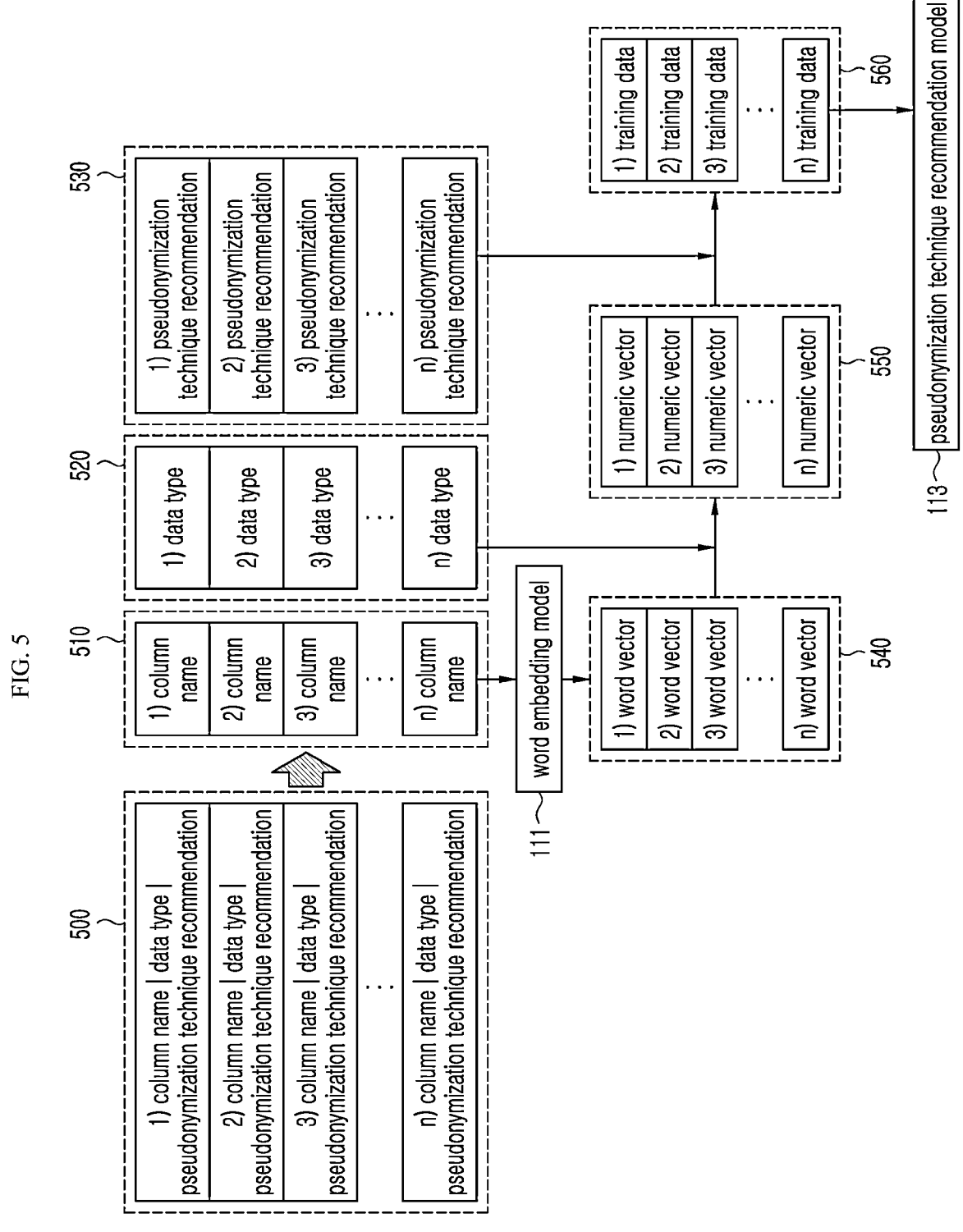
FIG. 5 conceptually shows data processed in the learning process of the artificial intelligence-based learning model.

FIG. 4 is a flowchart provided to explain a learning process of an artificial intelligence-based learning model, and FIG. 5 conceptually shows data processed in the learning process of the artificial intelligence-based 1 earning model.

Referring to FIGS. 4 and 5, the first computing device 100 may receive training dataset 500 for training a first learning model and/or a second learning model, at S410. The first learning model and the second learning model may be artificial intelligence-based neural network models. Hereinafter, the first learning model will be referred to as a pseudonymization technique recommendation model and the second learning model will be referred to as a word embedding model.

The dataset 500 input at S410 may include a plurality of pieces of data with corresponding column names, data types, and pseudonymization technique recommendations, as shown in Table 1, for example.

TABLE 1

| NO | Column Name | Data Type | Pseudonymization Technique Recommendation |
|---|---|---|---|
| 1 | Name | Character | Masking |
| 2 | Age | Numeric | Categorization |
| . . . | . . . | . . . | . . . |
| n | Education Expenses | Numeric | Aggregation |

Table 1 shows an example of n pieces of data that include column names, data types, and pseudonymization technique recommendations. This plurality of pieces of data may be created by data pseudonymization experts or may be created based on already pseudonymized data. For example, experts may match pseudonymization technique recommendations to column name-data type pairs, or pseudonymized datasets may be analyzed to extract, for each of the columns, the column name, data type, and applied pseudonymization technique corresponding to the column to prepare a plurality of pieces of data as shown in Table 1. Of course, training datasets created by various methods in addition to the methods described herein may be used to train the pseudonymization technique recommendation models and/or the word embedding models.

At S420, the first computing device 100 may separate the column names, data types, and pseudonymization technique recommendations 510, 520, 530 from the dataset 500 input at S410, and train the word embedding model 111 using the plurality of column names 510 separated from the plurality of pieces of data, at S430. At S430, the word embedding model 111 may be trained to output corresponding quantified vector (word vector) in response to an input of a column name, and if the word embedding model 111 has already been trained, it may be retrained at S430.

The word embedding is a method of expressing words in quantified vectors and may be implemented using word embedding models such as Word2Vec, FastText, Global Vector for Word Representation (Glove), etc. Among the word embedding models, the FastText model, which has strength in recognizing words themselves, may be used to convert column names made up of strings of Korean characters into numerical data.

The FastText model breaks a word into characters and builds information for each character based on the information on surrounding characters. In this manner, the FastText model has the characteristic that it creates vector data based on the relationship between characters, so if the characters used in two different words are similar, the vector data will be also similar.

When training the word embedding model 111 is complete, the first computing device 100 may input each of the plurality of column names 510 separated from the plurality of pieces of data into the word embedding model 111 as input data to obtain a plurality of word vectors 530 for each of the column names 510, at S440.

The first computing device 100 may add a data type vector corresponding to the data type 520 corresponding to each column name to the word vector 530 obtained from each column name at S440 to create a plurality of numeric vectors 550, at S450. For example, the numeric vectors 550 may be created by adding "0" to each word vector 530 if the data type is a numeric and adding "1" if the data type is a character. Specifically, since the data type of the word vector obtained from the column name "name" is the character, a numeric vector may be created by adding "1".

At S460, the first computing device 100 may generate a plurality of pieces of training data 560 by labeling each of the plurality of numeric vectors 550 created at S450 with the pseudonymization technique recommendation 530. For example, if there are n pseudonymization technique recommendations, the one-hot encoding technique may be used to create labeling data as an n-dimensional vector, that is, one-hot vector in which a position value corresponding to the pseudonymization technique recommendation is "1" and the rest position values are "0".

At S470, the first computing device 100 may train the pseudonymization technique recommendation model using the plurality of pieces of training data 560 generated at S460. At S470, the pseudonymization technique recommendation model may be trained to output a corresponding pseudonymization technique recommendation in response to an input of a numeric vector obtained corresponding to the column name and data type. The pseudonymization technique recommendation model may use a supervised learning-based artificial intelligence neural network model. For example, supervised learning models such as Decision Trees, Random Forests, Gradient Boosting Trees, Classification and Regression trees (CART), Iterative Dichotomiser 3 (ID3), C5.0 (successor of ID3, C4.5), etc. In particular, a Gradient Boosting Trees model that applies Gradient Boosting Trees, which is an ensemble technique, may be used to implement a more accurate decision tree model.

Figure 7:
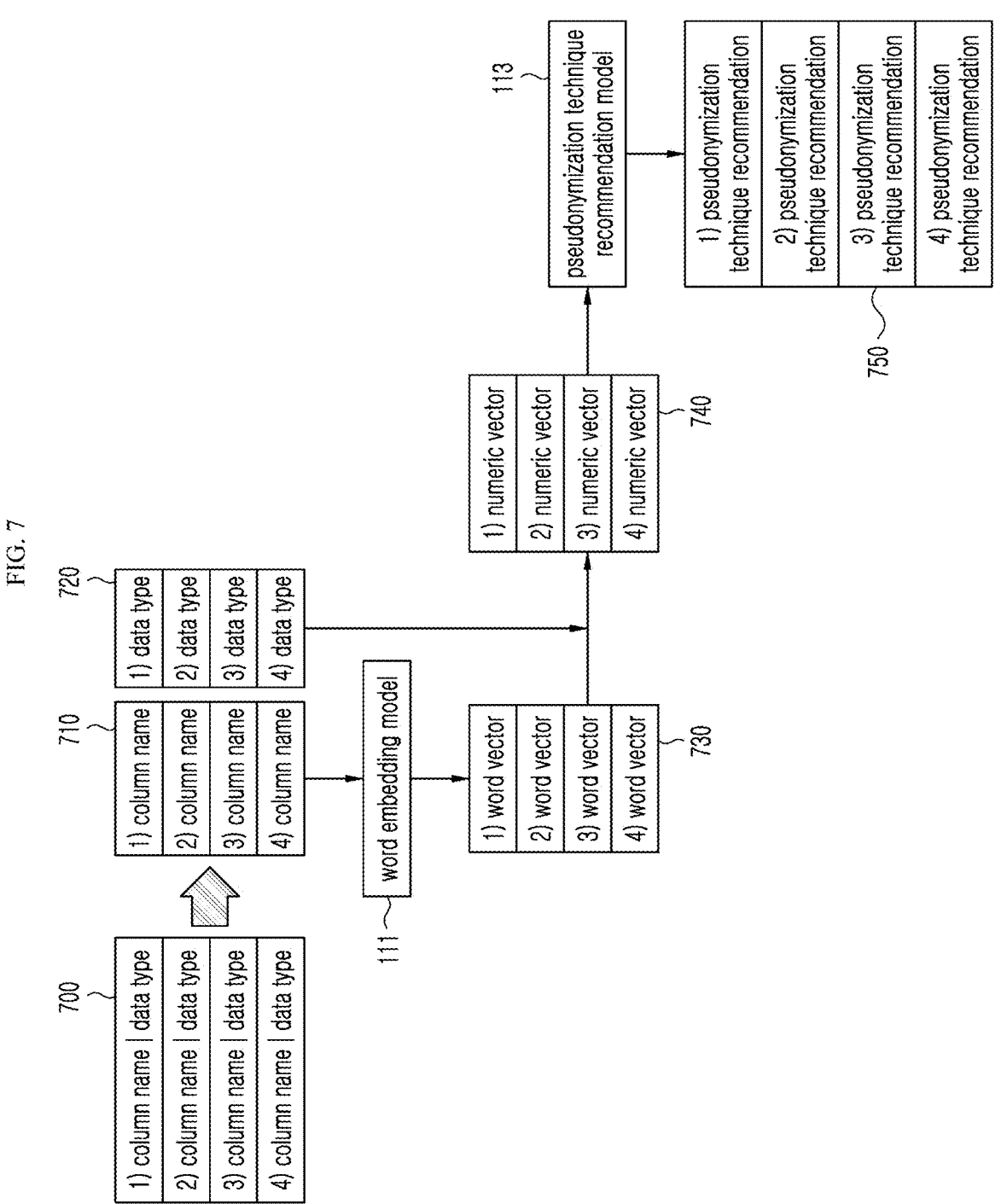
FIG. 7 conceptually shows data processed in the pseudonymization technique recommendation process using artificial intelligence.

FIG. 6 is a flowchart showing a pseudonymization technique recommendation process using artificial intelligence, and FIG. 7 conceptually shows data processed in the pseudonymization technique recommendation process using artificial intelligence.

Referring to FIG. 6, the first computing device 100 may receive, from the second computing device 200, a request for pseudonymization technique recommendation, at S610. At S610, the second computing device 200 may obtain a column name and data type for each column of the dataset to be pseudonymized, and transmit data 700 including the column name and data type corresponding to each column to the first computing device 100. Of course, in other examples, the second computing device 200 may directly transmit the dataset to be pseudonymized to the first computing device 100 and the first computing device 100 may directly obtain the data 700 including the column name and data type corresponding to each column of the dataset to be pseudonymized.

The following method may be used for obtaining the data 700 from the dataset to be pseudonymized. For example, for an Excel dataset like Table 2, the contents of each cell in the first row may be analyzed to identify column names, and the data values from the second row through a predetermined row in each column may be analyzed to determine the data types.

TABLE 2

| ID | Name | Age | Gender | Email |
|---|---|---|---|---|
| 1 | Gildong, Hong | 30 | Male | hong@example.com |

TABLE 2-continued

| ID | Name | Age | Gender | Email |
|----|------|-----|--------|-------|
| 2 | Younghee, Kim | 27 | Female | kim@example.com |
| 3 | Cheolsoo, Lee | 49 | Male | lee@example.com |

Referring to Table 2, column names "Name", "Age", "Gender", and "Email" can be obtained from the first row. By analyzing the data value for each column, it can be determined that the data types of the first and third columns are "numeric", and the data type of the second, fourth, and fifth columns are "character".

The first computing device 100 may input the column name 710 obtained corresponding to each column of the dataset to be pseudonymized into the word embedding model 111 to obtain a word vector 730 corresponding to each column, at S620.

The first computing device 100 may add the data type vector corresponding to the data type 720 to the word vector 730 obtained for each column of the dataset to be pseudonymized, to create a numeric vector 740 for each column of the dataset to be pseudonymized, at S630.

The first computing device 100 may input the plurality of corresponding numeric vectors 740 obtained corresponding to each column of the dataset to be pseudonymized into the previously trained pseudonymization technique recommendation model 113 to obtain the pseudonymization technique recommendation 750 for each column of the dataset to be pseudonymized, at S640.

The first computing device 100 may provide the second computing device 200 with the pseudonymization technique recommendation obtained for each column of the dataset to be pseudonymized, at S650.

The second computing device 200 may perform pseudonymization for each column of the dataset to be pseudonymized based on the pseudonymization technique recommendation provided by the first computing device 100, at S660. In an implementation, the second computing device 200 may provide a user with the pseudonymization technique recommendation information before S660 and receive, from the user, a selection as to whether or not to apply the corresponding pseudonymization technique recommendation for each column.

The example in which the first computing device 100 and the second computing device 200 are separate devices from each other has been described above, but the aspects are not limited thereto, and the first computing device 100 and the second computing device 200 may be integrated into one device, in which case the training the word embedding model and pseudonymization technique recommendation model, generating the pseudonymization technique recommendation information for the dataset to be pseudonymized using the trained model, and performing the pseudonymization for the dataset to be pseudonymized may be executed in one computing device.

Note that different industries may handle different data items that require pseudonymization and may need to apply different pseudonymization techniques. In consideration of this, each of the plurality of pieces of data included in the training dataset may further include classification information of industries such as education, health/medical care, finance, telecommunications, etc.

The word vector, data type vector, and industry classification vector may be obtained for each of the plurality of pieces of data included in the training dataset and the word vector, the data type vector, or the industry classification vector may be connected to obtain numeric vectors. For example, for the industry classification vector, if there are n pieces of industry classification information, the one-hot encoding technique may be used to create an n-dimensional vector, that is, one-hot vector in which a position value corresponding to the industry classification information is "1" and the rest position values are "0".

The process of generating training data by labeling the vector corresponding to the pseudonymization technique recommendation for the numeric vector including the industry classification vector, and training the pseudonymization technique recommendation model using the generated training data is the same as the one previously described.

When receiving a request for pseudonymization technique recommendation from the second computing device 200, the first computing device 100 may also receive the industry classification information corresponding to the industry that will utilize the dataset to be pseudonymized. In this case, the second computing device 200 may add the industry classification vector when creating the numeric vectors for each column of the dataset to be pseudonymized. In this way, the pseudonymization technique recommendations tailored to the industry that utilizes the dataset may be provided.

The embodiments described above may be implemented as a hardware component, a software component, and/or a combination of a hardware component and a software component. For example, the devices, methods, and components described in the embodiments may be implemented by using one or more general computing device or specific-purpose computing device such as a processor, a controller, an arithmetic logic unit (ALU), a digital signal processor, a microcomputer, a field programmable gate array (FPGA), a programmable logic unit (PLU), a microprocessor, or any other device capable of executing instructions and responding thereto. The processing device may execute an operating system (OS) and one or more software applications executed on the operating system. Further, the processing device may access, store, operate, process, and generate data in response to the execution of software. For convenience of understanding, it is described in certain examples that one processing device is used, but one of ordinary skill in the art may understand that the processing device may include a plurality of processing elements and/or a plurality of types of processing elements. For example, the processing device may include a plurality of processors or one processor and one controller. In addition, other processing configurations such as a parallel processor are possible.

The software may include a computer program, code, instructions, or a combination of one or more of the above, and may configure the processing unit, or instruct the processing unit independently or collectively to operate as desired. Software and/or data may be interpreted by the processing device or, in order to provide instructions or data to the processing device, may be embodied in any type of machine, component, physical device, virtual equipment, computer storage medium or device, or signal wave transmission, permanently or temporarily. The software may be distributed over networked computer systems and stored or executed in a distributed manner. The software and data may be stored on one or more computer-readable recording media.

The method according to the embodiment may be implemented in the form of program instructions that can be executed through various computer means and recorded in a computer-readable medium. The computer readable medium may include program instructions, data files, data structures, and the like alone or in combination. The program instructions recorded on the medium may be those specially designed and configured for the purposes of the embodiments, or may be known and available to those skilled in computer software. Examples of computer readable recording medium include magnetic media such as hard disks, floppy disks, and magnetic tape, optical media such as CD-ROMs and DVDs, magneto-optical media such as floptical disks, and hardware devices specifically configured to store and execute program instructions such as ROM, RAM, flash memory, and the like. Examples of the program instructions include machine language codes such as those generated by a compiler, as well as high-level language codes that may be executed by a computer using an interpreter, and so on. The hardware device described above may be configured to operate as one or more software modules in order to perform the operations according to the embodiments, and vice versa.

As described above, although the embodiments have been described with reference to the limited drawings, a person of ordinary skill in the art can apply various technical modifications and variations based on the above. For example, even when the described techniques are performed in the order different from the method described above, and/or even when the components of the system, structure, device, circuit, and the like are coupled or combined in a form different from the way described above, or replaced or substituted by other components or equivalents, an appropriate result can be achieved.

The invention claimed is:

1. An automatic pseudonymization technique recommendation method using artificial intelligence, wherein the method is implemented on a computing device comprising a processor, and a memory storing instructions or programs executable by the processor, and comprises:

receiving, at the computer device, a training dataset including a plurality of pieces of data including a column name, a data type, and a pseudonymization technique recommendation;

connecting, at the computer device, for each of the plurality of pieces of data, a data type vector obtained from the data type with a word vector obtained corresponding to the column name to obtain a numeric vector, and labeling the numeric vector with the pseudonymization technique recommendation to generate a plurality of pieces of training data;

training, at the computer device, a first learning model using the plurality of pieces of training data so that the first learning model outputs a pseudonymization technique recommendation in response to an input of the numeric vector;

obtaining, at the computer device, a numeric vector corresponding to each column of the dataset to be pseudonymized;

inputting, at the computer device, the numeric vector obtained corresponding to each column of the dataset to be pseudonymized into the trained first learning model to obtain a pseudonymization technique recommendation for each column of the dataset to be pseudonymized; and performing pseudonymization on the dataset to be pseudonymized based on the pseudonymization technique recommendation obtained for each column of the dataset to be pseudonymized, wherein the plurality of pieces of data included in the training dataset further includes industry classification information;

the numeric vector obtained when generating the training data further includes an industry classification vector obtained from industry classification information; and the obtaining the numeric vector corresponding to each column of the dataset to be pseudonymized includes:

inputting a column name corresponding to each column of the dataset to be pseudonymized into a second learning model to obtain a word vector of each column of the dataset to be pseudonymized;

obtaining a data type vector corresponding to the data type of each column of the dataset to be pseudonymized;

obtaining an industry classification vector corresponding to industry classification information previously set for the dataset to be pseudonymized; and connecting the data type vector and the industry classification vector with the word vector obtained for each column of the dataset to be pseudonymized to obtain a numeric vector corresponding to each column of the dataset to be pseudonymized, wherein the data type includes at least a numeric type and a character type.

2. The method of claim 1, further comprising training or retraining the second learning model using a plurality of column names obtained from the training dataset.

3. The method of claim 2, wherein the first learning model is a decision tree model, and the second learning model is a word embedding model.

4. The method of claim 3, wherein the word embedding model is a FastText model, and the decision tree model is a Gradient Boosting Trees model.

5. A non-transitory computer-readable recording medium recording a program for executing the automatic pseudonymization technique recommendation method using artificial intelligence as set forth in claim 1.

6. A computing device, comprising:

a processor; and a memory storing instructions or programs executable by the processor, wherein, when the instructions or programs are executed by the processor, the automatic pseudonymization technique recommendation method using artificial intelligence as set forth in claim 1 is executed.

* * * * *